L. F. COLL.
WINDOW CLEANING SEAT.
APPLICATION FILED DEC. 2, 1916.
1,259,960.
Patented Mar. 19, 1918.
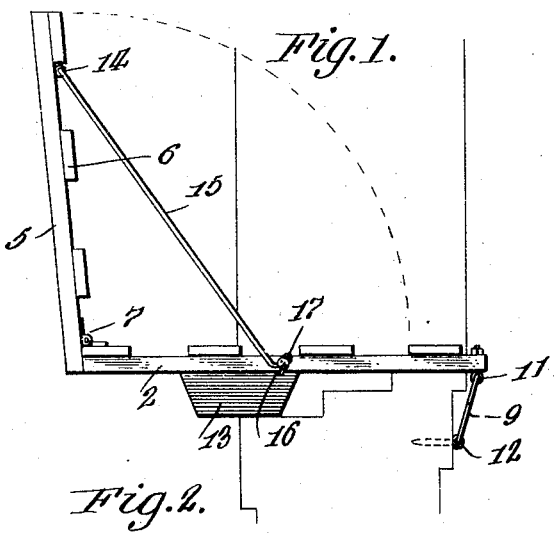
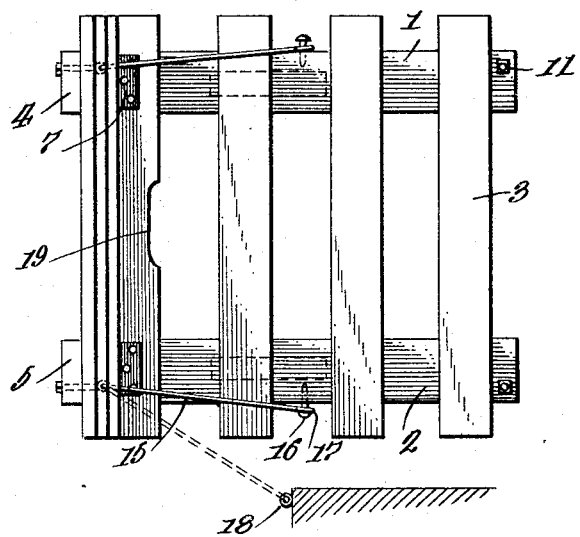
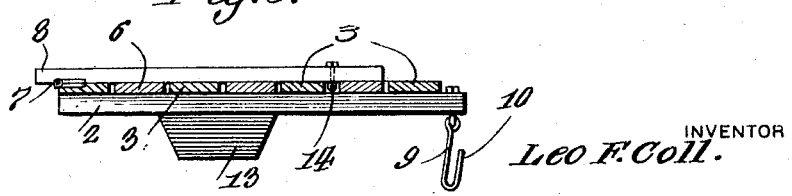
WITNESSES
Guy M. Spring
Lloyd W. Patch
INVENTOR
Leo F. Coll.
BY Richard B. Owen,
ATTORNEY

UNITED STATES PATENT OFFICE.

LEO F. COLL, OF BALTIMORE, MARYLAND.

WINDOW-CLEANING SEAT.

1,259,960.     Specification of Letters Patent.     Patented Mar. 19, 1918.

Application filed December 2, 1916. Serial No. 134,649.

*To all whom it may concern:*

Be it known that I, LEO F. COLL, a citizen of the United States, residing at Baltimore city, State of Maryland, have invented certain new and useful Improvements in Window-Cleaning Seats, of which the following is a specification.

This invention relates to an improvement in window cleaning seats, and more particularly to a seat of this character intended to be removably fitted in place to permit a window washer to sit upon the sill with comparative safety.

An object of my invention is to provide a seat which will extend horizontally when placed upon the sill and which has securing means so arranged in conjunction therewith that the seat is to be detachably mounted and may thus be used upon a number of various windows, the device being of such a character that it can be carried around by the window washer.

A further object lies in foldably mounting a back in conjunction with the seat and so arranging the structure of the seat and back that each is made up of a plurality of slats extending in parallel relation and spaced apart in such a manner that as the back is folded down a practically solid and continuous structure is provided to be used as a platform when the window washer desires to stand on the outside of the window to wash the upper sash, or for any other purpose, this arrangement of the parts also permitting the back and seat to be folded to come within a comparatively small compass.

With the above and other objects in view, my invention consists in certain novel features of construction and combinations of parts which will be hereinafter set forth in connection with the drawings and then more particularly pointed out in the claims.

In the drawings:—

Figure 1 is a view showing the seat in side elevation and fitted upon the sill of a window in the position for use.

Fig. 2 is a plan view of the seat as disclosed in Fig. 1.

Fig. 3 is a sectional view taken from front to back through the structure and with the back portion folded down upon the seat portion.

The structure comprises in the main parts, the seat portion and the back portion. The seat portion is made up of the frame or supporting bars 1 and 2 which have the slats 3 secured thereon to thus shape the seat portion to be substantially rectangular in outline. The back portion has the main frame members 4 and 5 thereof spaced apart in such a way that they are in the same planes respectively with the frame members 1 and 2 of the seat portion, and slats 6 are secured across between these frame members 4 and 5 to make a back portion which is also of substantially rectangular form and which is of the same width as the width of the seat portion owing to the fact that the slats 3 and 6 are made of equal length. Hinges 7 are disposed between the seat portion and back portion so that parts of the frame members 4 and 5 of the back portion extend as is shown at 8, and thus as the back is brought to the raised position as shown in Fig. 1, the extension portions 8 will bear against the outer ends of the frame members 1 and 2 and consequently the back portion will be supported against falling or swinging outwardly from an upright position.

Hooks 9, which are provided with long bills as shown at 10 are connected with the seat portion by means of eye bolts 11 secured through the inner ends of the frame members 1 and 2, and in fitting the seat in place, these hooks will have the bills thereof passed through the screw eyes 12 which are secured in the window trim on the inner side of the window and below the inner sill. These hooks 9 will hold the parts in such relation that the frame members 1 and 2 rest upon the inner sill, and the seat portion will extend in a substantially horizontal plane. However, due to the fact that the outer sill of the window is ordinarily lower than the inner sill, it is preferable that the filling or supporting blocks 13 be mounted on the lower side of the frame members 1 and 2 to bear upon the outer sill. It will of course be understood that the supporting blocks 13 will be made of proper height to compensate for the difference between the outer and inner sills of the windows upon which the seat is to be used, and by placing the screw eyes 12 in the proper position, the seat portion will thus be supported positively against displacement and against tendency to shift from the horizontally disposed position.

The slats 6 of the back portion and the slats 3 of the seat portion are so spaced that when the back portion is brought to the folded position as is shown in Fig. 3, the slats 6 will fit in the spaces between the slats 3, and thus when the seat structure is supported in the manner as hereinbefore set forth and a party washing windows desires to stand upon the seat structure to reach an upper sash, or to reach to greater height than is permitted when sitting in the seat, this interfitting of the slats of the two portions of the seat will provide a substantially continuous floor. When the back portion is swung to the raised position, the extension 8 will hold the same against excessive outward swinging movement, as has been hereinbefore set forth. However, when any of the weight of the user is placed against the back portion, the tendency will be to strain the parts, and it is therefore desirable that some additional means of bracing and securing the back against excessive movement be provided. With this purpose in mind, I provide the eye bolts 14 which are secured through the frame members 4 and 5 adjacent to the upper ends thereof and have the brace bars 15 hingedly connected therein. Pins 16 are mounted in the side of the frame members 1 and 2, and the ends of these brace bars or rods 15 are made substantially of hook form as shown at 17 so that when the back portion has been brought to the raised position, this hooked portion 17 can be placed over the pin 16 and then the rod 15 will act to positively brace the back portion with respect to the seat. Under some circumstances it may be desired to brace the back portion from the window framing, and under such circumstances the eye screws 18 can be secured in the outer portions of the window frame at each side and then the hooked ends 17 of the rods 15 can be inserted through these eye screws and the same bracing and securing action will be accomplished. In either fitting of the brace rods 15, they will extend at the sides of the seat and will thus form side guards, the entire seat structure being thus constructed to give proper support and to give maximum safety.

It is preferable that one of the slats 3 be cut or notched out as is shown at 19, and thus in the fitting of the seat in the operative position, the hooks 9 can be placed within the eyes 12 while the entire seat structure is yet within the room, the hand can then be inserted through the hand hole formed by the notch or cut out at 19, and the seat can be swung out on the inner sill as a fulcrum until the blocks 13 rest upon the outer sill, after which the position of the hand hole makes it very easy to raise the back portion to bring the same to the upright position. From the foregoing it will be seen that I have provided a seat structure which can be readily inserted in place in a window and as readily removed, that the back portion when swung to the lowered or folded position makes the entire seat structure of very small compass and also presents a substantially continuous floor upon which the user can stand and walk when the seat is in place without danger of his feet passing between the slats which might occur if the interfitting connection between the slats of the back and seat were not provided, that the back portion is connected with the seat portion in a manner to be substantially self-braced and that the additional bracing means forms a brace rod forming substantially inclosing side guards, thus making it practically impossible for a person seated within the seat to fall from the window even though the person might become dizzy or unconscious.

While in the foregoing I have shown and described only one specific form of the device, it will be understood that a number of changes and modifications might be resorted to in the form and arrangement of the several parts without departing from the spirit and scope of my invention, and hence I do not wish to be limited to the exact disclosure but only to such points as may be set forth in the claim.

I claim:

In a window cleaning seat, the combination of two rectangular members each composed of a pair of parallel bars with spaced slats connecting them, one of said members being hinged to the other whereby a seat and back are formed, means for detachably holding the back in upright position, the slats of the back being positioned to fit between those of the seat when the back is folded to form a substantially solid platform, and means for connecting the seat to a support, mounting it horizontally upon and securing it to a window sill.

In testimony whereof I affix my signature in presence of two witnesses.

LEO F. COLL.

Witnesses:
 MARTIN G. BAUERNSCHUB,
 JAMES E. COX.

Copies of this patent may be obtained for five cents each, by addressing the "Commissioner of Patents, Washington, D. C."